A. P. PLATES.
ROTARY INTERNAL COMBUSTION ENGINE.
APPLICATION FILED MAR. 11, 1909.
932,321.
Patented Aug. 24, 1909.
2 SHEETS—SHEET 1.
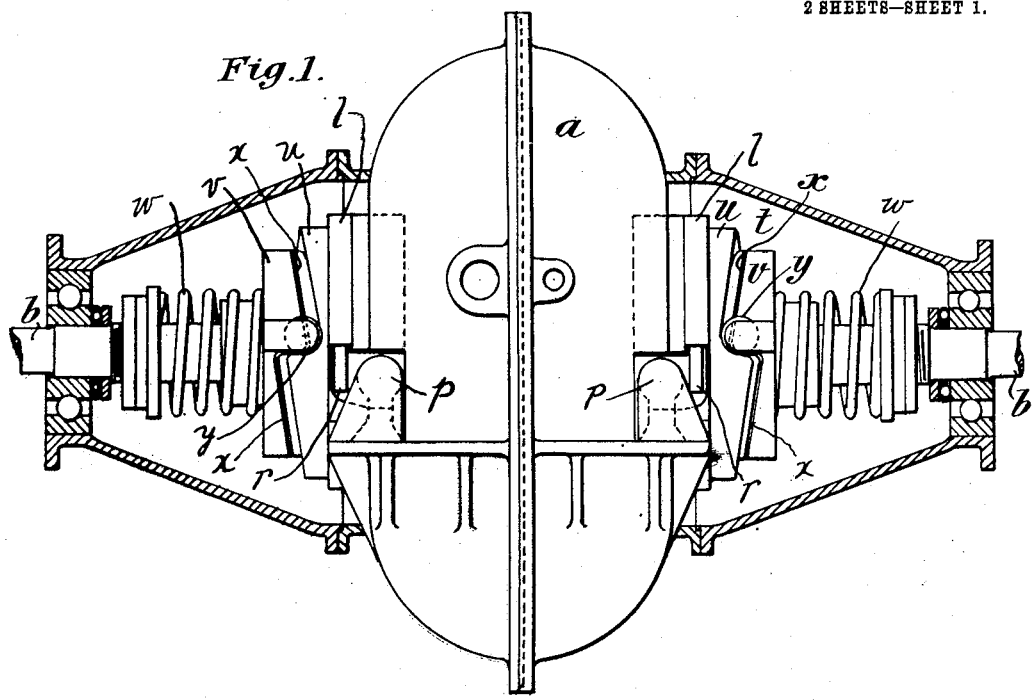
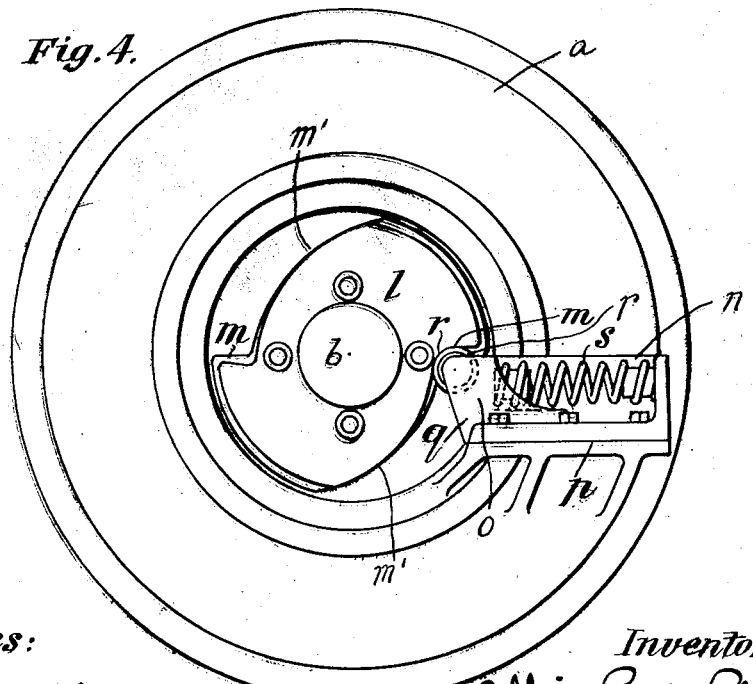
Witnesses:
J. K. Droore
R. E. Barry
Inventor:
Albin Paul Plates.

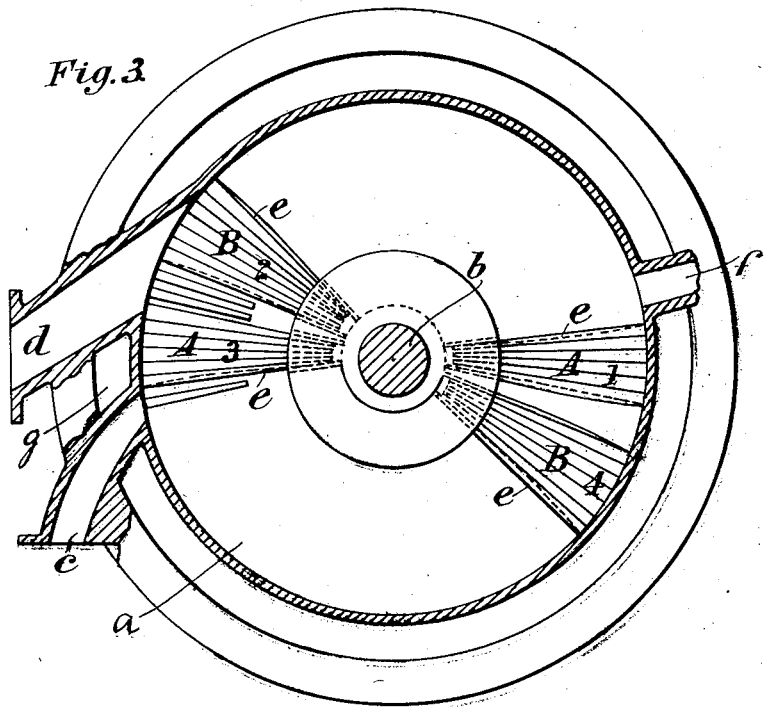
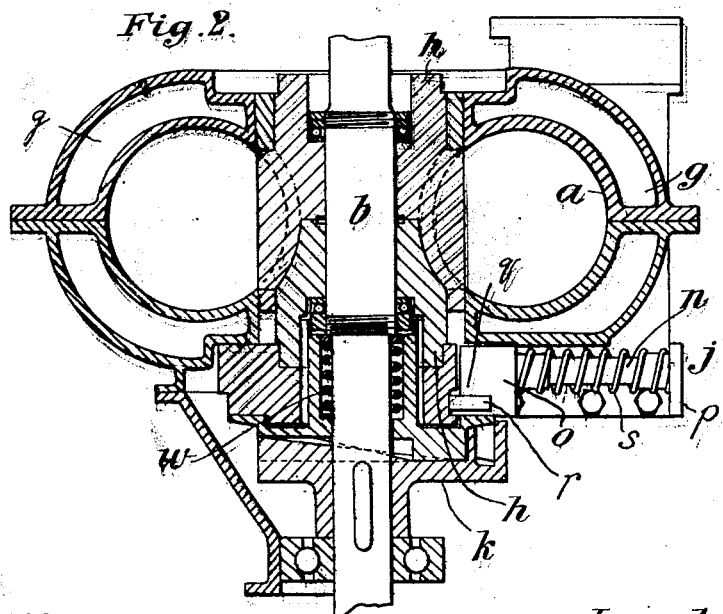

UNITED STATES PATENT OFFICE.

ALBIN PAUL PLATES, OF LONDON, ENGLAND, ASSIGNOR TO PLATES RICHARDS ROTARY ENGINE LIMITED, OF LONDON, ENGLAND.

ROTARY INTERNAL-COMBUSTION ENGINE.

932,321.   Specification of Letters Patent.   Patented Aug. 24, 1909.

Application filed March 11, 1909. Serial No. 482,710.

*To all whom it may concern:*

Be it known that I, ALBIN PAUL PLATES, a subject of the King of Great Britain, residing at 24 Richmond Gardens, Shepherds Bush, London, England, have invented new and useful Improvements in and Relating to Rotary Internal-Combustion Engines, of which the following is a specification.

Rotary internal combustion engines of the annular-chamber type are known wherein two pairs of vanes are employed to operate alternately as a piston and as an abutment, for which purpose each pair of vanes is combined with a locking device for maintaining it stationary to serve as an abutment, and with a device for coupling it to the engine shaft when it acts as a piston so as to drive the shaft. Now, according to this invention as applied to an engine in which a plurality of pairs of vanes are so formed and mounted on one shaft to operate in the same chamber; each pair of vanes is so combined with the shaft that the latter is free to overrun them, the arrangement being such that one vane of one pair and one vane of another pair act alternately as a piston and as an abutment respectively and move together at or about the point of the maximum compression of the charge.

I will now explain the construction of an engine embodying my invention by way of example with reference to the accompanying drawings wherein:—

Figure 1 is a side sectional elevation, Fig. 2 is a sectional plan of a slightly modified form of engine wherein the spring $w$ is arranged internally around the shaft and also in this case the two parts $l$ and $u$ are made separate instead of in one piece $l$ as in Fig. 1, Fig. 3 is a transverse sectional elevation, and Fig. 4 is an end elevation.

The annular chamber $a$ is of usual construction and is arranged with the shaft $b$ passing through its axis horizontally. The admission and exhaust ports, $c$ and $d$ respectively, are located in proximity at the same side of the chamber $a$ with the latter (i. e. the exhaust port $d$) uppermost, and both are controlled by the vanes $e$, $e$, $e$, $e$. At the other side at $f$ the ignition device, such as a sparking plug, is fitted. The chamber is suitably water-jacketed as indicated by the letter $g$.

I employ two pairs of vanes and for clearness I will call one pair of vanes A and the other B and will further number the vanes of A, 1 and 3, and those of B, 2 and 4, as they are arranged in this order in the chamber $a$. The vanes $e$, $e$, $e$, $e$ are loosely mounted on the shaft $b$. Each pair A and B consists of a central boss $h$ surrounding the shaft $b$ and from which the vanes $e$, $e$, $e$, $e$, project at diametrically opposite points. The vanes $e$, $e$, $e$, $e$ are fitted with the piston rings. The boss $h$ of one pair of vanes extends to the exterior of the chamber $a$ at one side, and the other to the other side, where each pair is furnished with means $j$ for locking it in the stationary or abutment position, and means $k$ for coupling it to the shaft $b$ in the working or operative position. Such means $j$ and $k$ may be of any suitable kind, though I prefer what I am about to explain. For locking, I secure to the boss $h$ a cam $l$ having two oppositely-situated shoulders $m$, $m$ for engaging and disengaging a locking device $n$ and provided with inclines $m'$ between said shoulders. This device $n$ is disposed radially of the cam $l$ and comprises a member $o$ mounted on a bracket $p$ on the chamber $a$ so that it may slide to and fro, its end $q$ adjoining the cam $l$ being appropriately fashioned with regard to the shoulders $m$, $m$ and furnished with a roller $r$. Between the rear of the slidable member $o$ and the contiguous portion of its supporting bracket $p$ I apply a spring $s$ always tending to effect the engagement with the cam $l$. Therefore the spring $s$ effects and maintains the engagement of the catch $n$ with a shoulder $m$ and so the pair of vanes $e$, $e$ are held stationary as abutments, while when the cam $l$ revolves, due to the vanes $e$, $e$ moving, the disengagement results and the vanes $e$, $e$ act as pistons.

For coupling the vanes $e$, $e$ to the shaft $a$ I provide a clutch $t$ comprising a fixed and a movable member $u$ and $v$, the former, $u$, being fixed to the boss $h$ of the vanes $e$, $e$, and the other $v$ to the shaft $b$, either of the members $u$ or $v$ being furnished with a spring $w$ for forcing it into contact with the other member $u$. The contacting faces $x$ of the members are helically-formed, and the movable member $v$ is provided with a roller $y$ for effecting the disengagement of the member $v$ when that pair of vanes $e$, $e$ is being held stationary while the shaft $b$ is being revolved by the other pair e, e. Hence the over-running of the vanes e, e, e, e relatively to the shaft is obtained.

The sliding catch o of the locking means n admits of an effective contact arrangement for the ignition device. Thus one contact may be on the catch n and the other on the bracket p, the whole being suitably insulated as and where required.

To insure the combined movement of the pairs A and B of vanes e, e, e, e just previous to an explosion, I may provide on their bosses h notches and spring pins for coacting therewith as the moving boss registers with the stationary one. Other mechanical means may of course be substituted.

To start the engine a previously-compressed charge is or may be introduced between a pair of vanes from a pump or from a portable or other reservoir.

Having described the construction of my engine, I will now explain its operation. Assuming the vanes A are moving and acting as pistons, that the vanes B are serving as abutments therefor; thus the vanes B are held stationary by their cam l and catch n, and the vanes A are driving the shaft b–b by the clutch t. Assuming further that an explosion has taken place with regard to vane 1 of A, then as this vane drives the exhaust of the previous explosion with regard to vane 2 of B, which is now reposing between the exhaust and admission ports, the vane 3 of A compresses the charge previously drawn in by the operation of vane 4 of B, and at the same time draws in a fresh charge. As soon as the vane 1 opens the exhaust port d, then the pressure falls below that of the compressed mixture between vane 3 of A and vane 4 of B whereupon the vanes B move conjointly with the vanes A in consequence of the momentum of the latter vanes and the pawl and notch devices (if any) aforesaid, and as a result the cam l and locking device n of the vanes, A engage and lock them, while the like parts of the vanes B disengage, and on the explosion taking place between the vanes 3 and 4 the operations explained are repeated.

It will now be evident that I provide a very simple and compact valveless engine giving four impulses every two revolutions of the shaft, or, in other words, four suction, compression, explosion and exhaust periods every single revolution of a pair of vanes.

I may in some constructions of the engine wish to cut out an explosion or explosions, and I accordingly provide means for this purpose. Thus I may employ a cam for coacting with the clutch in such manner that when in engagement the normal explosions occur but when disengaged some are cut out.

Having now practicularly described and ascertained the nature of my said invention and in what manner the same is to be performed, I declare that what I claim is:—

1. In a rotary internal combustion engine, the combination with an annular cylinder provided with inlet and exhaust ports and a pair of double acting concentrically mounted vanes therein, of a concentric shaft, connections between each of said double acting vanes and the shaft permitting the shaft to over run the vanes at all times, and devices for locking each of said vanes against backward movement.

2. In a rotary internal combustion engine, the combination with an annular cylinder provided with inlet and exhaust ports and a pair of double acting concentrically mounted vanes therein, of a concentric shaft, connections between said shaft and each of said vanes for operatively connecting them at two diametrically opposite positions with respect to each other, said connections being constructed to permit the shaft to over run the vanes at all times, and devices for locking each of the vanes at two diametrically opposite positions against backward movement.

3. In a rotary internal combustion engine, the combination with the annular cylinder provided with inlet and exhaust ports, a concentric driving shaft and a pair of double acting vanes mounted on said shaft, a clutch member carried by each of said vanes, clutch members carried by said shaft and engaging said first mentioned clutch members, the engaged clutch members having the one a pair of diametrically opposite shoulders, and inclined portions adjacent thereto, and the other having yielding devices to engage said shoulders and inclined portions and means for locking each of said vanes against backward rotation.

4. In a rotary internal combustion engine, the combination with the annular cylinder provided with inlet and exhaust ports, a concentric driving shaft and a pair of double acting vanes mounted on said shaft, a clutch member carried by each of said vanes, clutch members carried by said shaft and engaging said first mentioned clutch members, the engaged clutch members having the one a pair of diametrically opposite lateral shoulders and inclined faces adjacent thereto and the other having portions to engage said shoulders and inclined faces, and springs holding said clutch members in engagement, and means for preventing the backward movement of said vanes.

5. In a rotary internal combustion engine, the combination with an annular cylinder provided with inlet and exhaust ports and a pair of double acting concentrically mounted vanes therein, of a concentric shaft, connections between each of said double acting vanes and the shaft permitting the shaft to over run the vanes at all times and a locking device secured to and rotating with each of said vanes, provided with locking shoulders disposed diametrically opposite to each other, and a spring actuated device mounted on a stationary part and engaging said locking device for preventing the backward movement of said vanes.

6. In a rotary internal combustion engine, the combination with the annular cylinder provided with inlet and exhaust ports, a concentric driving shaft and a pair of double acting vanes mounted on said shaft, a clutch member carried by each of said vanes, clutch members carried by said shaft and engaging said first mentioned clutch members, the engaged clutch members having the one a pair of diametrically opposite lateral shoulders and inclined faces adjacent thereto and the other having portions to engage said shoulders and inclined faces, and springs holding said clutch members in engagement, and a locking device secured to and rotating with each of said vanes, provided with locking shoulders disposed diametrically opposite to each other, and a spring actuated device mounted on a stationary part and engaging said locking device for preventing the backward movement of said vanes.

ALBIN PAUL PLATES.

Witnesses:
JOHN E. BOUSFIELD,
C. G. REDFERN.